United States Patent [19]

Uchida et al.

[11] Patent Number: 4,958,095
[45] Date of Patent: Sep. 18, 1990

[54] STARTER-ALTERNATOR FOR A VEHICLE ENGINE

[75] Inventors: Hiroyasu Uchida, Hiroshima; Kazuhiko Ueda, Higashihiroshima; Hiroyuki Oda, Hiroshima, all of Japan

[73] Assignee: Mazda Motor Corporation, Hiroshima, Japan

[21] Appl. No.: 205,188

[22] Filed: Jun. 10, 1988

[30] Foreign Application Priority Data

Jun. 10, 1987 [JP] Japan ................................. 62-145748

[51] Int. Cl.$^5$ ............................................... H02K 9/00
[52] U.S. Cl. ..................................... 310/59; 310/263; 123/41.31
[58] Field of Search ........................ 310/54, 58, 59, 74, 310/113, 159, 160, 180, 257, 263; 123/41.31

[56] References Cited

U.S. PATENT DOCUMENTS

| | | | |
|---|---|---|---|
| 4,141,669 | 2/1979 | Darby et al. | 310/59 |
| 4,421,998 | 12/1983 | Ahner et al. | 310/263 |
| 4,548,164 | 10/1985 | Yloner et al. | 123/198 E |
| 4,584,496 | 4/1986 | Frister | 310/263 |
| 4,617,485 | 10/1986 | Nakamura et al. | 310/59 |
| 4,622,923 | 11/1986 | Nishimura et al. | 123/198 E |
| 4,659,950 | 4/1987 | Gotoh | 310/59 |
| 4,739,204 | 4/1988 | Kitamura et al. | 123/41.31 X |
| 4,757,221 | 7/1988 | Kurihashi et al. | 310/58 X |

FOREIGN PATENT DOCUMENTS

61-54949 11/1986 Japan.

Primary Examiner—Peter S. Wong
Assistant Examiner—Kristine Peckman
Attorney, Agent, or Firm—Fleit, Jacobson, Cohn, Price, Holman & Stern

[57] ABSTRACT

A starter-alternator of a vehicle of the type being disposed between a vehicle engine and a transmission case having a field pole member coupled to an engine crankshaft of the vehicle engine. Crow-poles are interspaced to form alternating N and S poles. A field winding is stationarily placed radially inside the crow-poles. A three phase stator winding is stationarily placed to surround the crow-poles, and a housing accommodates the stator-alternator elements therein and connects the vehicle engine and the transmission case. The housing is provided with an air passage for introducing fresh air into the housing so as to blow it toward the three phase stator winding in order to cool it, and an air outlet pipe discharges air inside the housing. In association with either one or both of the windings, a water pipe in communication with a water jacket of the vehicle engine is provided to circulate cold water therethrough.

25 Claims, 8 Drawing Sheets

STARTER-ALTERNATOR FOR A VEHICLE ENGINE

FIELD OF THE INVENTION

The present invention relates to an engine starter for an internal combustion engine for a vehicle and more particularly to a starter-alternator used in a starter functioning as an alternator for a vehicle engine.

BACKGROUND OF THE INVENTION

An apparatus for cranking a vehicle engine and generating alternating current (which is hereinafter referred to as a starter-alternator) is well known. One such starter-alternator is disclosed in Japanese Pat. application No. 56-176,498 entitled "ENGINE STARTING AND CHARGING EQUIPMENT" filed Nov. 5, 1981 and laid open May 13, 1983, which comprises a flywheel with field poles formed on the outer periphery thereof, an exciting field winding disposed radially inside and radially spaced apart from the field poles of the flywheel with a slight clearance, and a stator winding assembly disposed surrounding the field poles of the flywheel for generating a revolving magnetic field. In such a starter-alternator, the flywheel with the field poles is used as a member for bearing an element of a clutch mechanism to connect or disconnect the transmission of power from an engine crankshaft of the vehicle engine and an input shaft of a transmission case. The starter-alternator thus constructed not only allows itself to be incorporated snugly between the vehicle engine and the transmission case in a power train of the vehicle but smoothly changes the transmission of engine power by controlling an amount of current flowing through the stator winding so as to accelerate or decelerate the flywheel.

A problem with such a starter-alternator is that functional activities decline due to aging. This decline of functional activities of these windings makes it hard to conduct a current because of an increased electric resistance due to heat generated in the field winding and stator winding, heat produced by friction between a clutch plate of a manual transmission case and the flywheel disposed between an engine clutch housed in a clutch housing, or heat transmitted by a fluid of a torque converter of an automatic transmission.

In particular, because of intense heat emanating from the starter winding in which a current flow is frequently alternated in the opposite directions, problems are experienced when restarting the vehicle engine by the starter-alternator when the vehicle engine is hot.

OBJECT OF THE INVENTION

It is, therefore, an object of the present invention to provide a starter-alternator which is prevented from attaining an undesirable temperature so as to fulfill the intended function thereof.

SUMMARY OF THE INVENTION

A particular feature of the present invention resides in the cooperation of a cooling mechanism for controlling the a starter-alternator under s suitable working temperature which results from the general consideration of construction, arrangement, heat generating characteristics of the starter-alternator.

In accordance with the present invention, the starter-alternator is of the type disposed between a vehicle engine and a transmission case and comprises a housing in which a rotary field pole member coupled to an output shaft of the vehicle engine and having two series of crow-poles forming alternating N and S poles, a field winding stationarily disposed radially inside and spaced slightly apart from the two series of crow-poles, and a stator winding stationarily disposed to surround the two series of crow-poles; an air passage formed in the housing for taking in fresh air and discharging it to cool at least one of the field and stator windings; and an air outlet connected to the housing for discharging air inside the housing.

According to a preferred embodiment of the present invention, the starter-alternator has the air passage provided with an air intake open facing to the front for taking in fresh air when the vehicle is traveling, and a plurality of air nozzles for discharging the fresh air therethrough to blow on the stator winding, thereby cooling the stator winding.

By applying current to the field winding, the field pole member with the two series of crow-poles is excited to form alternating N and S poles. When current is applied to the stator winding, the field pole member spins to turn the engine output shaft, such as an engine crankshaft, so as to crank the vehicle engine. This is a function of the starter-alternator as a starter. While the vehicle engine is continuously in motion, the field pole member also continues to spin, creating a counter electromotive force in the stator winding. When cutting current is applied to the stator winding, the starter-alternator functions as an alternator.

While the vehicle is traveling, the air passage is supplied with fresh air taken in through the air intake and discharges the fresh air into the housing, in particular, toward the stator winding through the air nozzles, to blow air against the stator winding and cool it. The air discharged or blown into the housing is forced to be discharged out of the housing through the air outlet as a result of the rotation of the field pole member.

According to another preferred embodiment of the present invention, in addition to the provision of the air passage, a water passage either internally or externally accompanies at least one of the field and stator windings. This water passage is in communication with a water jacket of the vehicle engine to circulate a cold water therethrough so as to cool the winding.

Owing to the provision of the air passage and the water passage, the stator and field windings themselves and the air inside the housing are prevented from rising in temperature above an operating temperature desirable for the starter-alternator.

BRIEF DESCRIPTION OF THE DRAWINGS

The above and other object and features of the present invention will be apparent to those skilled in the art from the following description taken in conjunction with preferred embodiments thereof with reference to the accompanying drawings wherein like parts are designated by same reference numerals and in which.

DETAILED DESCRIPTION OF THE INVENTION

A starter-alternator according to a preferred embodiment of the present invention is used in cooperation with an internal combustion engine for a vehicle. Because such internal combustion engines are well known, this description will be directed in particular to elements forming part of or cooperating directly with apparatus embodying the present invention. It is to be understood, however, that vehicle engine elements not specifically shown or described may take various forms known to those skilled in the vehicle art.

Figure 1:
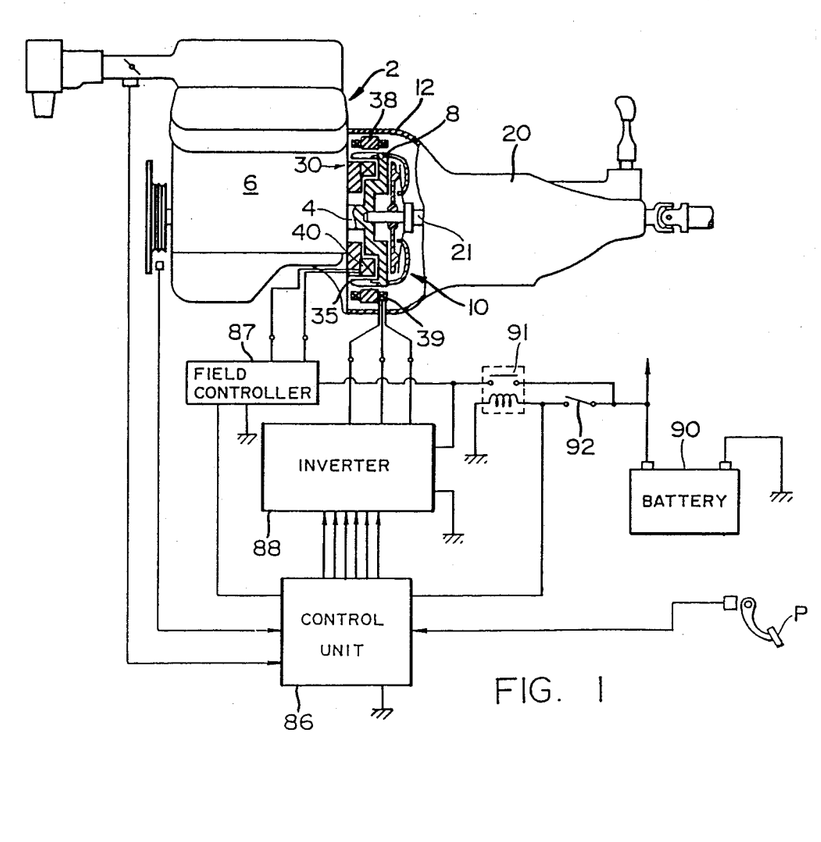
FIG. 1 is a schematic illustration showing a vehicle engine, with its associated elements, in which the starter-alternator of the present invention is incorporated.

Referring now to FIG. 1, there is illustrated a V-type internal combustion engine provided with a manual transmission case, between the vehicle engine and the manual transmission case, a starter-alternator according to the present invention being incorporated. As shown, the V-type internal combustion engine 2 has an engine crankshaft 4 extending outward from a cylinder block 6 and carries a flywheel 8 attached to the outer end of the engine crankshaft 4. A clutch mechanism 10, which is of the type having a single diaphragm spring plate and connects or disconnects the transmission of power from the engine crankshaft 4 of the vehicle engine 2 to an input shaft 21 of the manual transmission 20, is coupled to the flywheel 8 and covered by a clutch housing 12 which is mounted on the cylinder block 6 through a cylindrical mounting member 14. On the clutch housing 12, there is mounted the input shaft 21 of the manual transmission 20 for rotation by means of a bearing 16. Operation and construction of the manual transmission 20 is well known to those skilled in the art and need not be explained in detail herein.

Figure 3:
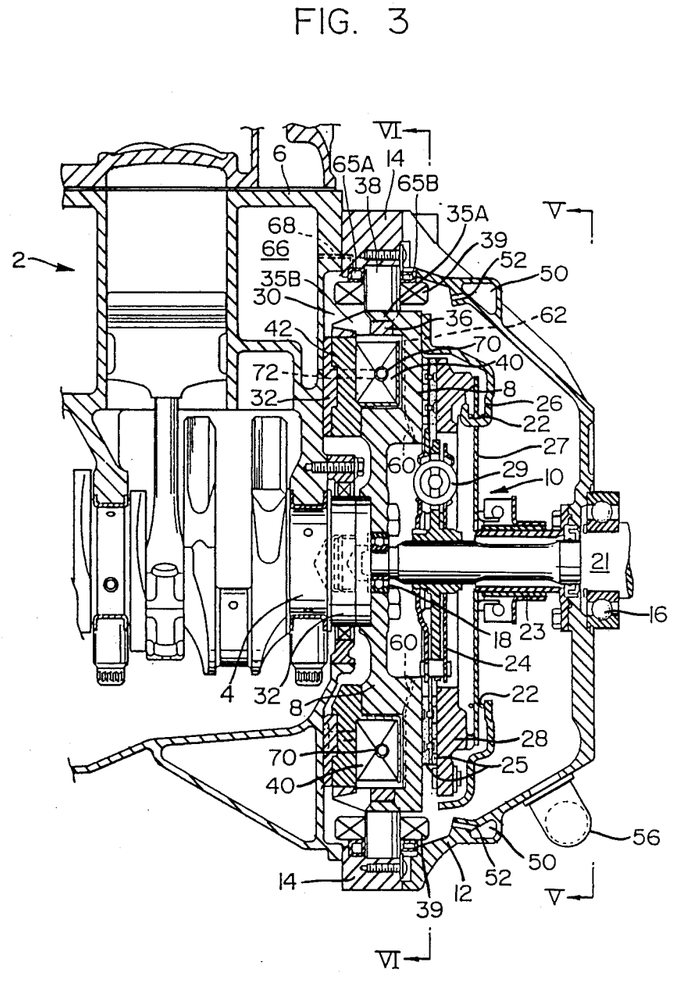
FIG. 3 is a cross sectional view showing the starter-alternator of a preferred embodiment according to the present invention which is cooperated with an engine clutch disposed between a vehicle engine and a manual transmission and accommodated within a clutch housing.
Figure 4:
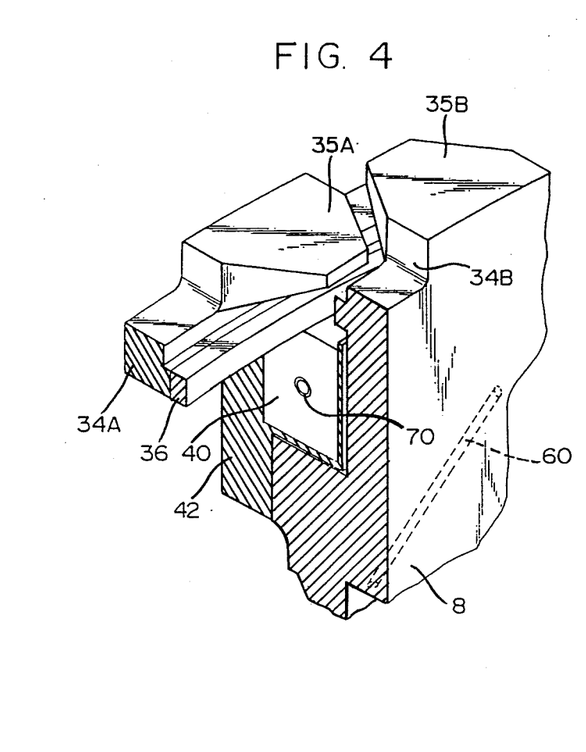
FIG. 4 illustrates a portion of the flywheel illustrated in FIG. 3.
Figure 5:
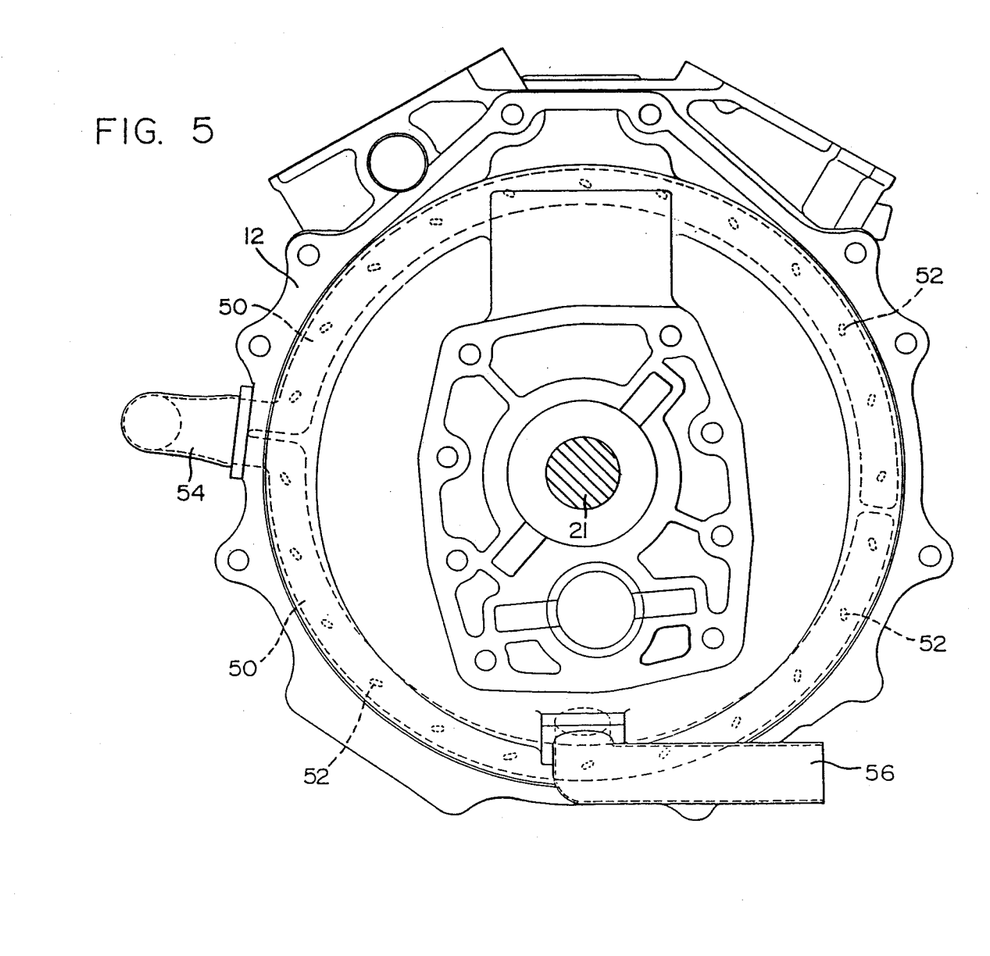
FIG. 5 is a rear view of the clutch housing in the direction of a line V—V of FIG. 3.

Referring to FIGS. 3 to 5 showing the starter-alternator 30 according to the present invention which is arranged inside the clutch housing 12, the flywheel 8 is specifically attached to the outer end of the engine crankshaft 4 through a shielding disk 32 preferably made of a stainless steel for shielding a magnetic field. On the outer periphery of the flywheel 8, there are provided an outer pole core 34A formed integrally therewith and an inner pole core 34B attached thereto through an annular mounting ring 36 made of a non-magnetic material, each pole core 34A, 34B having a series of crow-poles 35A, 35B arranged at regular intervals. The inner and outer series of crow-poles 35A and 35B are alternately arrayed with circumferential separation to form a rotary field pole.

On the inner surface of the cylindrical mounting member 14, there is attached a stator core 38 facing to the outer peripheral surface of the inner and outer pole cores 34A and 34B with a slight radial clearance. The stator core 38 which is of a stack of a number of silicon-steel annular rings and fixed to the cylindrical mounting member 14 carries a three phase stator winding 39. Inside the pole cores 34A and 34B, there is a field winding 40 for exciting the pole cores 34A and 34B wound around a field core 41 fastened to the cylinder block 6 through an annular plate 42 made of an aluminum material for shielding a magnetic field. This field winding 40 is disposed facing to the flywheel 8 with a slight axial separation and to the pole cores 34A and 34B with a slight radial separation.

The flywheel 8 has its outer smooth side surface acting as a clutch side surface against which a clutch disk plate of the clutch mechanism 10 is pressed. The inner end of the input shaft 21 of the manual transmission 20 is supported by means of a bearing 18 secured to the flywheel 8 for rotation. The input shaft 21 of the manual transmission 20 fixedly mounts thereon a clutch disk 24 having a friction disk plate 25. A clutch cover 26 attached to the flywheel 8 holds a diaphragm or crown spring 27 which acts usually to press the annular ring friction pads 25 against the outer smooth surface of the flywheel 8 through a pressure plate 28 made of cast iron. When the clutch disk 24 is pinched between the flywheel 8 and the pressure plate 28, the clutch disk 24 will turn to transmit engine power to the transmission case, in particular between the engine crankshaft 4 of the vehicle engine 2 and the input shaft 21 of the transmission case 20. If there is caused a change in angular velocity, that is absorbed by means of a damper spring 29. As is well known, when a clutch pedal P (shown in FIG. 1) is depressed, a clutch throw-out fork (not shown) is shifted to apply pressure to the center of the diaphragm spring 27 through a clutch through-out bearing 23, bending the diaphragm spring 27 inward to the left hand side as viewed in FIG. 3 with respect to pivot wire rings 22. As a result, the pressure plate 28 is released away from the flywheel 8, the clutch disk 24 will stand still while everything else continues to revolve, thereby to disconnect the transmission of engine power from the engine crankshaft 4 of the vehicle engine 2 to the input shaft 21 of the transmission case 20.

The clutch mechanism 10 used in this embodiment is of a diaphragm spring type single plate clutch of which the operation and construction is well known to those skilled in the art and, therefore, need not be explained in more detail therein.

Figure 6:
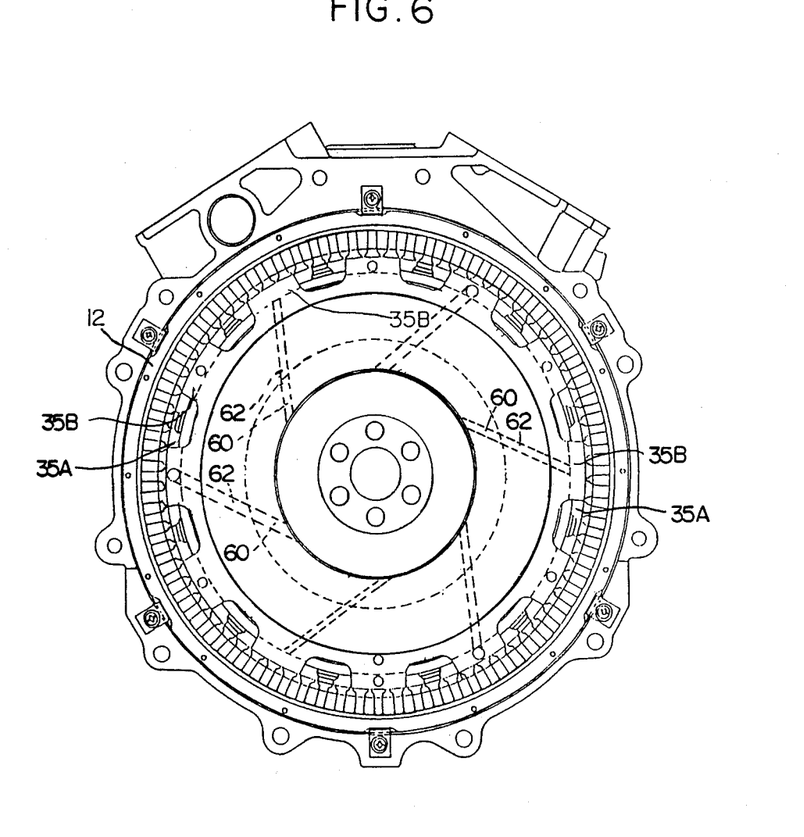
FIG. 6 is a cross sectional view of the starter-alternator taken along a line VI—VI of FIG. 3.

As is shown in FIGS. 3 and 5, the clutch housing 12 accommodating therein the clutch mechanism 10 and the starter-alternator 30 is formed with close ended semi-circular air passages 50 in communication with an air intake pipe 54 (see FIGS. 3 and 6) at their one end and with the inside of the clutch housing 12 at their other end. It is to be noted that the open end of the air intake pipe 54 has an air intake 55 directed to the forward direction in which the vehicle moves. Each air passage 50 is formed with a plurality of air nozzles 52 which are preferably arrayed at substantially regular intervals and oriented to face on the three phase stator winding 39. The clutch housing 12 is provided with an air discharge pipe 56 which, as is shown in FIG. 6, communicates the inside of the housing 12 and an engine room 3. By means of the air passages 50 with the air nozzles 52 provided between the air intake and discharge pipes 54 and 56, a flow of air is created in the air passages 50 when the vehicle is traveling and is partly discharged toward the three phase stator winding 39 in the clutch housing 12 through the air nozzles 52 to thereby cool it. By the discharge of air and the rotation of the flywheel 8, air in the clutch housing 12 is agitated and discharged out of the clutch housing 12 through the air discharge pipe 56.

Figure 7:
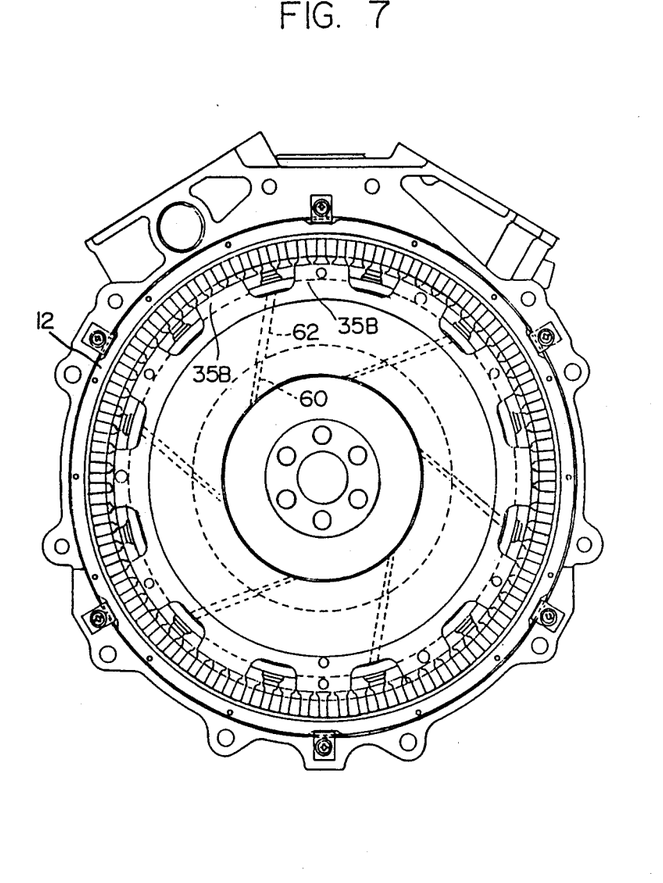
FIG. 7 is a cross sectional view similar to that of FIG. 6 and illustrating a starter-alternator of another preferred embodiment according to the present invention.

As best seen in FIGS. 3 and 6, in the flywheel 8, there is formed a plurality of air passages 60 extending from the outside surface to the inside surface of the flywheel 8. Each air passage 60 is inclined at an angle in a rearward direction with respect to the direction of rotation of the flywheel 8 so as to cause air inside the clutch housing 12 to flow thereinto as a result of the rotation of the flywheel 8. The air flowing into the air passage 60 is discharged by the centrifugal force created by the rotation of the flywheel 8 to blow against the field winding 40. At the inner end, the air passage 60 communicates with a substantially circumferentially extending groove 62 which terminates inside the outer crow-pole 35A. This groove 62 serves to guide and distribute the air discharged from the air passage 60 over the outer surface of the field winding 40. Alternatively, the groove 62 may, as is shown in FIG. 7, terminate between adjacent two outer crow-poles or crow-poles 35A and 35B so as to allow the discharged air to smoothly flux. For the provision of the air passages 60 and the guide grooves 62, the discharged air is sufficiently distributed over the outer surface of the field winding 40 and thereby to cool it.

On both sides of the stator core 38, there are annular water pipes 65A and 65B having a rectangular cross section and disposed externally surrounding the outer periphery of the three phase stator winding 39. Each water pipe 65A, 65B is in communication with a water jacket 66 of the cylinder block 6 of the vehicle engine 2 through several water passages 68 (only one of which appears in FIG. 3) to circulate cold water therethrough and thereby to cool the three phase stator winding 39.

As is seen in FIG. 3, in the field winding 40, there is embedded or buried an annular water pipe 70 having a circular cross section. This water pipe 70 is in communication with the water jacket 66 of the cylinder block 6 of the vehicle engine 2 through several passages 72 (only one of which appears in FIG. 3) to circulate cold water therethrough, and thereby to cool the field winding 40.

Figure 8:
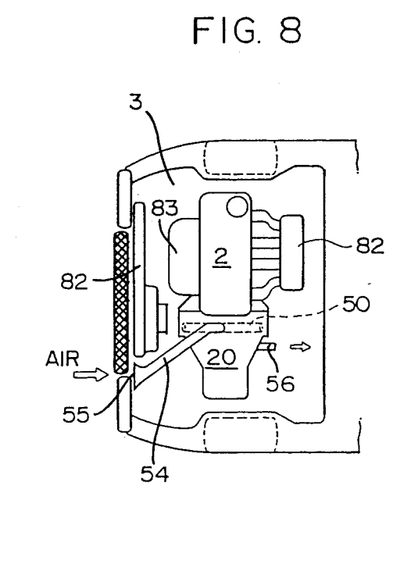
FIG. 8 is a schematic illustration showing an arrangement of the vehicle engine of FIG. 1.

Referring now to FIG. 8 showing an arrangement of the internal combustion engine 2 with the transmission case 20 in which the starter-alternator 30 of the present invention and the internal combustion engine 2 are installed sideways in an engine room 3 of the vehicle. Connected to the internal combustion engine 2 are an intake manifold 82 on the back side thereof and an exhaust manifold 83 on the front side thereof. The transmission case 20 is located on the left side of the internal combustion engine 2 as viewed in FIG. 8. At the front of the engine room 3 of the vehicle, there is a radiator 84. The air intake 55 of the air intake pipe 54 is located beside the radiator 84 so as to take fresh air into the air intake pipe 54 when the vehicle is traveling. It is to be noted that the starter-alternator of the present invention can be incorporated in vehicle engines which are installed lengthwise in the engine room 3 with the same result.

Figure 2:
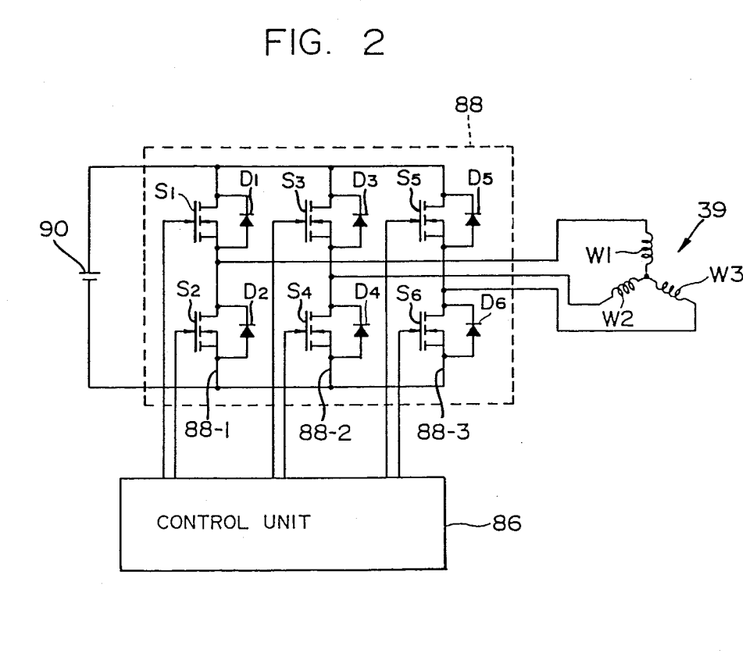
FIG. 2 is a circuit diagram of an inverter of a controlling system of the vehicle engine of FIG. 1.

In operation of the starter-alternator according to the preferred embodiment of the present invention, the starter-alternator 30 is controlled by a control system shown in FIGS. 1 and 2. The control system includes a control unit 86, a field controller 87 for the field winding 40, and an inverter 88 for the three phase stator winding 39. These are arranged to apply a current from a battery 90 directly to the control unit 86 and to the field controller 87 and the inverter 88 through a relay 91 when an ignition switch 92 in the driver's compartment is operated to start the internal combustion engine 2.

The inverter 88, as is shown in FIG. 2, has three current control circuits 88-1, 88-2 and 88-3 each being connected in parallel with the battery 90 and including two switching elements S1 and S2, S3 and S4, S5 and S6, connected in series. In parallel with each switching element S1 to S6, there is a diode D1 to D6 for allowing a current to flow from the plus to minus of the battery 90. Connected to the three current control circuits 88-1, 88-2 and 88-3 between the switching elements are first to third windings W1 to W3 of the three phase stator winding 39, respectively. By intermittently turning on and off the respective switching elements S1 through S6 with switching pulse signals, a three phase alternating current is applied to the three phase stator winding 39. The alternating current can be adjusted in phase by changing the timing of switching of the respective switching elements S1 through S6. Furthermore, the value of the three phase alternating current can be changed by modulating the width of pulse signal.

In order to crank the internal combustion engine 2, the starter-alternator is energized. By feeding direct current to the field winding 40 from the battery 90, the outer and inner pole cores 34A and 34B are exciting, forming alternate N-S-N-S poles. When current is fed to the three phase stator winding 39, the pole cores 45A and 45B are forced to spin. Consequently, the flywheel 8 is turned to rotate the engine crankshaft 4, so that the internal combustion engine 2 is cranked. For increasing torque, the current fed to the three phase stator windings 39 is alternated according to crank angles.

On the other hand, when shutting off electricity to the first to third windings S1 to S3 of the three phase stator winding 39 while maintaining the switching elements S1 through S6 turned off, the three phase alternating current flow is generated and rectified to direct current. This is accomplished by passing the alternating current into the diodes D1 through D6. The resultant direct current is charged in battery 90.

Conventionally, since the current flow in the three phase stator winding 39 is alternated frequently, the three phase stator winding 39 generally produces a large amount of heat. On the other hand, although the field winding 40 itself produces a relatively minute amount of heat, the field winding 40 is subject to heat because it is surrounded by the field core 41 and the flywheel 8 and, due to such a construction, heated air surrounding it is hard to escape. However, according to the starter-alternator of the present invention, as long as the vehicle travels, air is taken in from the outside of the engine room 3, is discharged through the air nozzles 52 formed in the clutch housing 12, and is blown against the three phase stator winding 39 to cool the three phase stator windings 39. The air inside the clutch housing 12 is taken in through the air passages 50 formed in the flywheel 8, is discharged and blown against the field winding 40 to cool it. In addition to cooling by air, the three phase stator winding 39 and the field winding 40 are either externally or internally cooled by cold water circulating between the water jacket 66 of the vehicle engine 2 and the water pipes 65A, 65B and 70. As additive effects obtained by the combined use of water cooling and air cooling, the temperature of the these windings 39 and 49 slightly increases but remains lower than eight degrees on the centigrade scale.

Figure 9:
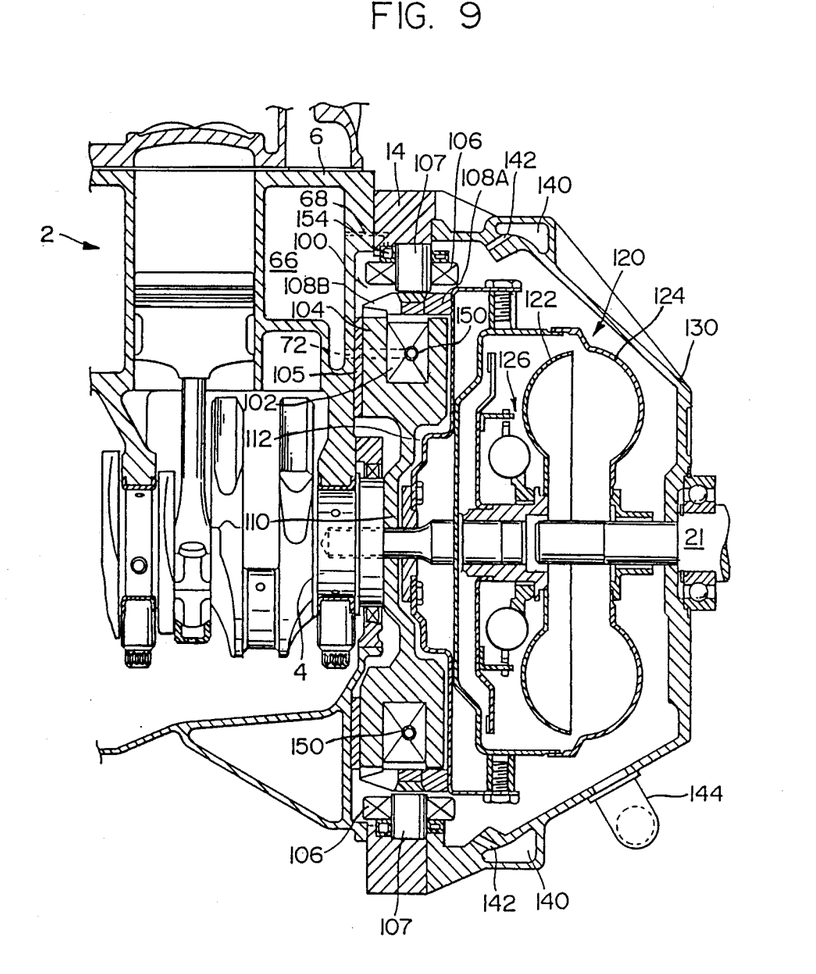
FIG. 9 is a cross sectional view similar to that of FIG. 3 and showing a starter-alternator of still another preferred embodiment according to the present invention with which a torque converter of an automatic transmission is cooperated.

Reference is now had to FIG. 9 showing the stator-alternator of another preferred embodiment according to the present invention which is cooperated by an automatic transmission accompanied by a torque converter. The starter-alternator 100 basically has the same construction as that of the previously described embodiment and comprises a field winding 102 placed in an annular groove formed in the outer periphery of a field core 104 attached to the cylinder block 6 of the vehicle engine 2 through an annular aluminum plate 105, and a three phase stator winding 106 comprising three windings separately placed on a stator core 107 attached to the inside surface of the cylindrical mounting member 14.

The engine crankshaft 4 is provided at its outer end with a mounting hub member 110 attached thereto. Bolted to the mounting hub member 110 is a flexible drive plate 112 which holds two series of crow-poles 108A and 108B arranged coaxially and interspaced, one series of crow-poles all forming N poles and the other series of crow-poles forming all N poles. The two series of crow-poles forming alternating N-S poles are placed over the field winding 102. The outer end of the flexible drive plate 112 bent back is fastened to driver or driving torus 124 of a torque converter 120. As is well known, the torque converter comprises the driving torus 124, a driven torus 122 coupled to a transmission input shaft 21, and a converter one way clutch assembly 126. Operation and fabrication of such a torque converter is well known to those skilled in the art and need not be explained in more detail therein. The starter-alternator elements and the torque converter are all covered by a converter housing 130 which is connected to the cylindrical mounting member 14.

The converter housing 130 is formed with an air passage 140 in communication with an air intake pipe similar to the air intake pipe 54 shown in FIGS. 3 and 6 at its one end and with the inside of the converter housing 130 at the other end. This air passage 140 is formed with a plurality of air nozzles 142 which are preferably arrayed at substantially regular intervals and oriented to face on the three phase stator winding 106. The converter housing is provided with an air discharge pipe 144 which communicates the inside of the converter housing 130 and an engine room 3 of the vehicle. Owing to the provision of the air passage 140 with the air nozzles 142, a flow of air is created in the air passage 140 when the vehicle is traveling and is partly injected toward the three phase stator winding 106 in the converter housing 130 through the air nozzle 142 thereby to cool it. As a result of the injection of air and the rotation of the flexible drive plate 112, air in the converter housing 130 is agitated and discharged out from the converter housing 130 through the air discharge pipe 144.

In the field winding 102, there is buried an annular water pipe 150 having a circular cross section and in communication with the water jacket 66 of the cylinder block 6 of the vehicle engine 2 through several water passage 72 (only one of which appears in FIG. 9.). Cold water is circulated passing through the water pipe 150 to cool the field winding 102.

In association with the three phase stator winding 106, there may be provided, if desirable, another water pipe 154 in communication with the water jacket 66 of the cylinder block 6 of the vehicle engine 2 at several positions. This water pipe 154 may be disposed either in the cylindrical mounting member 14 or on one or both sides of the three phase stator winding 106. Cold water is circulated through the water pipe 154 to cool the three phase stator winding 106.

The vehicle engine equipped with the starter-alternator of the other preferred embodiment according to the present invention is installed in the engine room 3 as shown in FIG. 8.

In any embodiment described above, it is desirable to provide a device, such as an injector or fan, either in or in front of the air intake pipe for forcing ventilation into the air passage.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A starter-alternator of a vehicle of the type being disposed between a vehicle engine having an output shaft and a transmission comprising:
    a rotary field pole member coupled to the output shaft of the vehicle engine and having two series of crow-poles which are interspaced, one series of crow-poles all forming N poles and the other series of crow-poles all forming S poles;
    a field winding mounted radially inside the two series of crow-poles;
    a stator winding mounted on the two series of crow-poles;
    a housing accommodating therein the rotary field pole, the field winding and the stator winding and connecting the vehicle engine and the transmission, said housing being provided with an air passage embedded in a wall thereof for taking in fresh air and directing it to cool at least one of the stator winding and the field winding and an air outlet for discharging air wherein said air passage is provided with an air intake opening facing to the front of the vehicle engine and plurality of air nozzles directing air for the air passage to blow air on and cool the stator winding.

2. A starter-alternator as defined in claim 1, wherein said air passage is of annular form substantially in parallel with the stator winding.

3. A starter-alternator as defined in claim 1, wherein said rotary field pole member is formed with at least one air passage extending from one side to the other side thereof and inclined rearward with respect to the direction of rotation of the flywheel for blowing air against the field winding.

4. A starter-alternator as defined in claim 3, wherein said rotary field pole member is a flywheel of the vehicle engine.

5. A starter-alternator of a vehicle of the type being disposed between a vehicle engine and a transmission comprising:
    a rotary field pole member coupled to an output shaft of the vehicle engine and having two series of crow-poles which are interspaced, one series of crow-poles all forming N poles and the other series of crow-poles all forming S poles;

a field winding mounted radially inside the two series of crow-poles;

a stator winding mounted on the two series of crow-poles;

a housing accommodating therein the rotary field pole, the field winding and the stator winding and connecting the vehicle engine and the transmission;

a water passage disposed in association with said field winding to introduce cold water from a water jacket of the vehicle engine; and an air passage formed in the housing and having an air intake opening facing to the front of the vehicle and a plurality of air nozzles directing air from the air passage to blow it on and cool the stator windings.

6. A starter-alternator as defined in claim 5, wherein said water passage is embedded in said field winding.

7. A starter-alternator as defined in claim 5, wherein said stator winding is associated with a water passage along the outer periphery thereof which communicates with said water jacket of the vehicle engine.

8. A starter-alternator as defined in claim 5, wherein the rotary field pole member is secured to a driver of a torque converter disposed between the starter-alternator and the transmission.

9. A starter-alternator as defined in claim 5, wherein said rotary field pole member is formed as a flywheel of the vehicle engine.

10. A starter-alternator as defined in claim 5, wherein said rotary field pole member is a flywheel of the vehicle engine which is formed with at least one air passage extending from one side to the other side thereof and inclined rearward with respect to the direction of rotation of the flywheel for blowing air against the field winding.

11. A starter-alternator as defined in claim 10, wherein said water passage is embedded in the field winding.

12. A starter-alternator as defined in claim 5, wherein said field winding is connected to the vehicle engine through a magnetic field shielding member.

13. A starter-alternator of a vehicle of the type being disposed between a vehicle engine and a transmission comprising:

rotary field pole member coupled to an output shaft of the vehicle engine and having two series of crow-poles which are interspaced, one series of crow-poles all forming N poles and the other series of crow-poles all forming S poles;

a field winding mounted radially inside the two series of crow-poles;

a stator winding mounted on the two series of crow-poles;

a housing accommodating therein the rotary field pole, the field winding and the stator winding and connecting the vehicle engine and the transmission;

a water passage disposed in association with said stator winding to introduce cold water from a water jacket of the vehicle engine; and an air passage formed in the housing and having an air intake opening facing to the front of the vehicle and a plurality of air nozzles directing air from the air passage to blow it on and cool the stator winding.

14. A starter-alternator as defined in claim 13, wherein said rotary field pole member is a flywheel of the vehicle engine which is formed with at least one air passage extending from one side to the other side thereof and inclined rearward with respect to the direction of rotation of the flywheel for blowing air against the field winding.

15. A starter-alternator of a vehicle of the type being disposed between a vehicle engine and a transmission case and comprising a rotary field pole member coupled to an output shaft of the vehicle engine and having two series of crow-poles which are interspaced, one series of crow-poles all forming N poles and the other series of crow-poles all forming S poles, a field winding fixedly mounted and covered by the two series of crow-poles, and a stator winding fixed to surround the two series of crow-poles, said started-alternator further comprising:

a housing for accommodating therein the starter-alternator;

an air passage formed in the housing for taking in fresh air and discharging it to cool at least one of the field winding and the stator winding and an air outlet wherein said air passage is provided with a plurality of air nozzles for discharging the fresh air taken in the air passage therethrough to blow and cool the stator windings; and a water passage accompanied by at least one of the field winding and the stator winding to circulate cold water therethrough so as to cool the winding wherein said water passage is in communication with a water jacket of the vehicle engine.

16. A starter-alternator as defined in claim 15, wherein said water passage is associated with said stator winding.

17. A starter-alternator as defined in claim 15, wherein said water passage is associated with said field winding.

18. A starter-alternator of a vehicle of the type having a rotor rotationally integrated with an output shaft of an engine, a field pole disposed on the periphery of the rotor, a field winding disposed radially inside the rotor for exciting the field pole, and a stator winding attached to a casing around the field pole in which an alternating current flow is created, said starter-alternator comprising:

a housing between a vehicle engine and a transmission for accommodating the starter-alternator therein;

an annular air passage formed in a wall of the housing along the stator winding;

an air intake opening facing to the front of the vehicle for introducing air into the air passage; and a plurality of air nozzles formed in the housing for directing air from the air passage to blow air on and cool the stator winding, wherein said air nozzle branches from the air passage toward the downstream of air flowing in the air passage at an angle with respect to the air passage.

19. A starter-alternator as defined in claim 18, wherein said housing is formed with an air outlet for discharging air.

20. A starter-alternator as defined in claim 19, wherein said rotor is secured to a driver of a torque converter disposed between the starter-alternator and the transmission.

21. A starter-alternator as defined in claim 19, wherein said rotor is formed as a flywheel of the engine.

22. A starter-alternator as defined in claim 18, wherein said rotor is formed with at least one air passage penetrating therethrough and inclined rearward with respect to a direction in which the rotor rotates.

23. A starter-alternator as defined in claim 22, wherein said rotor is formed as a flywheel of the engine.

24. A starter-alternator as defined in claim 18, wherein said field winding is connected to the vehicle engine through a magnetic field shielding member.

25. A starter-alternator as defined in claim 18, wherein said water passage is disposed in said field winding to cool directly the field winding.

* * * * *